(12) United States Patent
Takeuchi et al.

(10) Patent No.: US 7,491,285 B2
(45) Date of Patent: Feb. 17, 2009

(54) METHOD FOR MOLDING BEAD PORTION OF GREEN TIRE AND BEAD PORTION MOLDING DEVICE

(75) Inventors: Yuichi Takeuchi, Kobe (JP); Naoki Sugiyama, Kobe (JP)

(73) Assignee: Sumitomo Rubber Industries, Ltd., Kobe-shi (JP)

(*) Notice: Subject to any disclaimer, the term of this patent is extended or adjusted under 35 U.S.C. 154(b) by 450 days.

(21) Appl. No.: 11/232,887

(22) Filed: Sep. 23, 2005

(65) Prior Publication Data

US 2006/0070696 A1    Apr. 6, 2006

(30) Foreign Application Priority Data

Oct. 6, 2004    (JP) ............................. 2004-294077

(51) Int. Cl.
*B29D 30/24* (2006.01)
*B29D 30/32* (2006.01)

(52) U.S. Cl. ..................... 156/132; 156/135; 156/400; 156/402

(58) Field of Classification Search .............. 156/131, 156/132, 135, 398–403; 152/552
See application file for complete search history.

(56) References Cited

U.S. PATENT DOCUMENTS

| 1,760,929 | A | * | 6/1930 | Wikle | ............. | 156/402 |
| 3,654,007 | A | * | 4/1972 | Winstanley et al. | ............. | 156/132 |
| 3,841,377 | A | * | 10/1974 | Montagne | ............. | 152/543 |
| 3,990,931 | A | * | 11/1976 | Leblond et al. | ............. | 156/131 |
| 4,214,940 | A | * | 7/1980 | Rost | ............. | 156/402 |
| 6,736,177 | B2 | * | 5/2004 | Ueyoko | ............. | 152/552 |
| 6,770,160 | B2 | * | 8/2004 | Cordaillat et al. | ............. | 156/132 |
| 2003/0041976 | A1 | | 3/2003 | Evangelista et al. | | |

FOREIGN PATENT DOCUMENTS

| JP | 2001-246675 A | 9/2001 |
| JP | 2001-246676 A | 9/2001 |
| WO | WO-01/08874 A1 | 2/2001 |

* cited by examiner

*Primary Examiner*—Geoffrey L Knable
(74) *Attorney, Agent, or Firm*—Birch, Stewart, Kolasch & Birch, LLP (57) ABSTRACT

The method for molding a bead portion for a green tire includes a bead core supporting step for supporting the bead core through a carcass ply upon expanding a diameter of a bead core supporter including a seating surface for supporting a radially inner surface of the bead core. Since the bead core supporter comprises an outer piece outside of the seating surface in a tire axial direction that rises up towards outside in the radial direction with a clearance between the same and the bead core, that is larger than the thickness of the carcass ply, it is possible to flip a carcass outer region up, that is outside in the tire axial direction than a sandwiched region of the carcass ply, sandwiched and held between the seating surface and the bead core, and to deform the carcass outer region into an outer inclined piece that is inclined and extended towards radially outside without including any partially bent portions. It further includes a curving step of pressing the outer inclined piece inward in the tire axial direction by using a ply winding ring for curving the same towards the outside surface and the radially outer surface of the bead core, and a pressing step of pressing a tip end portion of the curved outer inclined piece towards the radially outer surface of the bead core by using a pressing roller.

10 Claims, 8 Drawing Sheets

METHOD FOR MOLDING BEAD PORTION OF GREEN TIRE AND BEAD PORTION MOLDING DEVICE

BACKGROUND OF THE INVENTION

1. Field of the Invention

The present invention relates to a method for molding a bead portion of a green tire capable of easily winding a carcass ply without the necessity of preliminarily forming a bending portion at the carcass cords when forming a green tire of so-called bead-wind structure in which both end portions of a carcass ply are wound around bead cores, and to a bead portion molding device employed for this purpose.

2. Description of the Related Art

Figure 9:
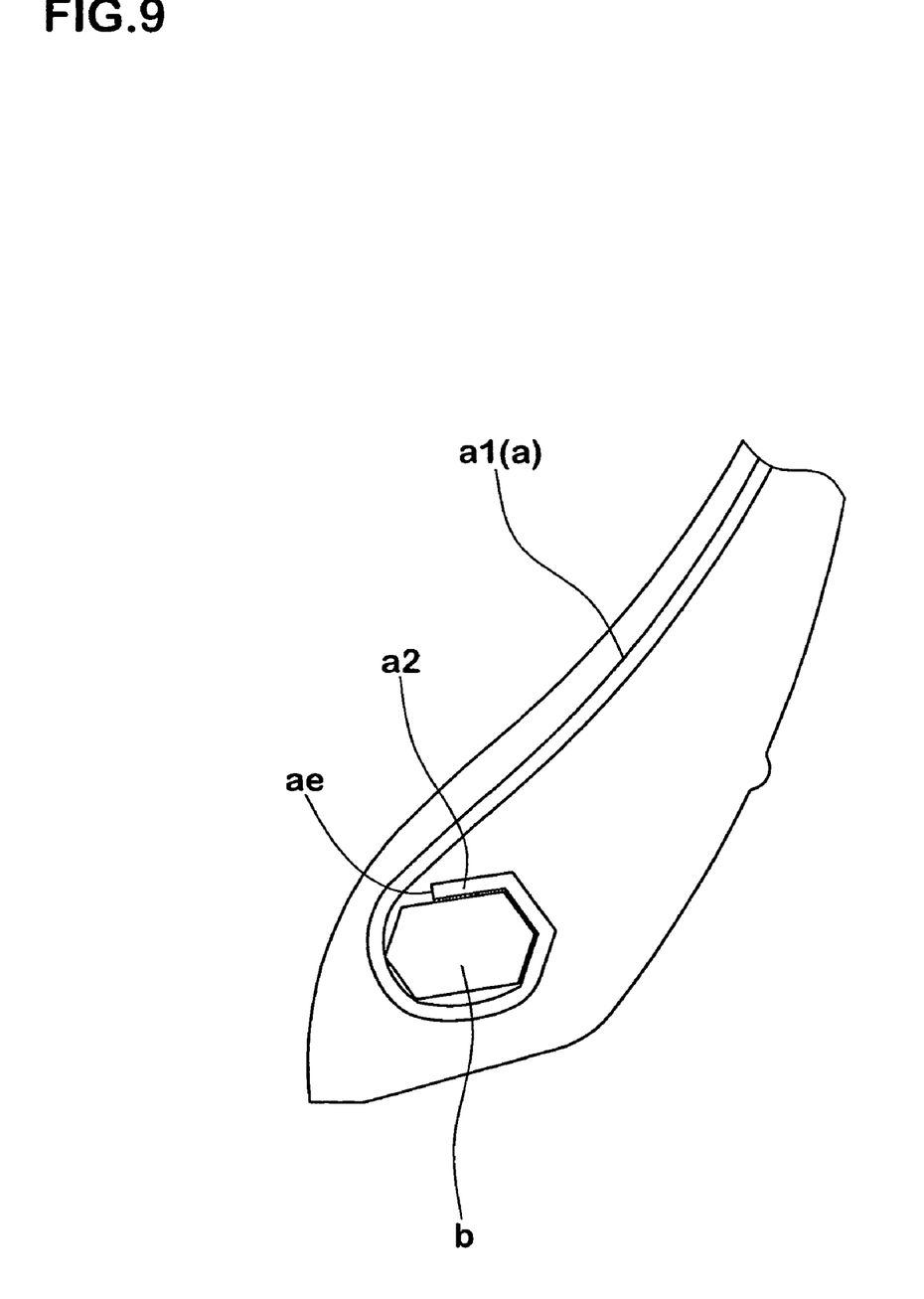
FIG. 9 is a sectional view of the bead portion for explaining background art.

As illustrated in FIG. 9, it is recently being suggested to employ a bead-wind structure in heavy-duty tires utilizing a carcass ply (a) of steel cords. In such a bead-wind structure, carcass wound portions (a2), in which the carcass ply is wound by substantially a whole round around the bead cores (b), are formed on both sides of a carcass main portion (a1) that bridges between bead cores (b, b) to thereby fix both end portions of the carcass ply (a).

In such a structure, tip ends (ae) of the carcass wound portions (a2) are interrupted proximate of the periphery of the bead cores (b) so that stress through deformation of the beads hardly acts onto the tip ends (ae). It is accordingly of advantage that damages such as loosening of cords originating from the tip ends (ae) can be effectively restricted. However, in this structure, the entire length of the carcass wound portions (a2) is short and a winding radius thereof small while a flexural rigidity of the carcass cords (steel cords) is large. A drawback is thus exhibited in that it is difficult to easily and accurately wind the carcass ply (a) around the bead cores (b) in the course of manufacturing a green tire.

It has thus been suggested in, for instance, Japanese Patent Application Laid-Open No. 2001-246675 or Japanese Patent Application Laid-Open No. 2001-246676 to preliminarily form a plastic-deformed bending portion in the carcass ply in which carcass cords are partially bent at respective positions that suit corner portions of the bead cores.

However, when bending is performed to the carcass cords, the rigidity and strength of the carcass cords will be degraded due to the partial bending so that there is a danger that damages originating from the bent portions of the cords are induced during running.

SUMMARY OF THE INVENTION

The present invention thus aims to provide a method for molding a bead portion of a green tire capable of easily, accurately and stably forming carcass wound portions that are wound around the bead cores without the necessity of preliminarily forming a bending portion at the carcass cords, and to provide a bead portion molding device employed for this purpose.

In one aspect of the invention, a method for molding a bead portion for a green tire includes a carcass ply of steel cords serially provided with carcass wound portions wound around bead cores on both sides of a carcass main body portion extending from a tread portion over sidewall portions up to the bead cores of bead portions, the bead cores having a polygonal sectional shape comprised of a radially inner surface opposing a seat surface of a rim, a radially outer surface parallel to the radially inner surface, a tire-axially outside surface connecting between tire-axially outer edges of the radially inner surface and the radially outer surface, and a tire-axially inside surface connecting between tire-axially inner edges of the radially inner surface and the radially outer surface, the method including:

a carcass tube forming step of forming a carcass tube by cylindrically winding the carcass ply on an outer periphery of a former, a bead core setting step of setting the bead core radially outside of the carcass tube, and a bead core supporting step of employing a bead core supporter expandable and shrinkable in diameter and having a seating surface for supporting the radially inner surface of the bead core while sandwiching the carcass ply between the seating surface and the bead core by expanding the diameter of the bead core supporter, the bead core supporting step further including a flip-up step of flipping up a carcass outer region defined as a portion of the carcass ply being outside in the tire axial direction than a sandwiched region of the carcass ply sandwiched between the seating surface and the bead core so as to become an outer inclined portion that inclines and extends towards outside in the radial direction without including any partially bent portions due to the provision of a flange at the bead core supporter that rises radially outside from a tire-axially outer end of the seating surface with a clearance between the same and the bead core, that is larger than the thickness of the carcass ply, a curving step of pressing the outer inclined piece inward in the tire axial direction by using a ply winding ring for curving the same towards the outside surface and the radially outer surface of the bead core, and a pressing step of pressing a tip end portion of the outer inclined piece in a curved condition towards the radially outer surface of the bead core by using a pressing roller.

In another aspect of the invention, a device employed for this purpose includes a former for forming a carcass tube by winding a carcass ply cylindrically on the outer periphery thereof, and a bead core supporting means that includes a bead core supporter including a seating surface that is set outside of the carcass tube in the radial direction for supporting the radially inner surface of the bead core and that is expandable and shrinkable in diameter for supporting the bead core while sandwiching the carcass ply between the seating surface and the bead core when expanded in diameter, the bead core supporter further including a winding means with an outer piece outside of the seating surface in the tire axial direction that rises up towards outside in the radial direction, and by setting a minimum value of a clearance between the outer piece and the bead core to be larger than the thickness of the carcass ply in the diametrically expanded condition of the bead core supporter, the outer piece flips a carcass outer region outside in the tire axial direction than the sandwiched region of the carcass ply sandwiched between the seating surface and the bead core up as an outer inclined piece that inclines and extends towards outside in the radial direction without including any partially bent portions, and a ply winding ring that is relatively movable with respect to the outer inclined piece in- and outside in the tire axial direction and that presses the outer inclined piece through relative movement towards inside in the tire axial direction for curving the outer inclined piece towards the outside surface and the radially (outer) surface of the bead core; and a shaping means including a pressing roller for pressing a tip end portion of the outer inclined piece in the curved condition towards the radially outer surface of the bead core.

Due to the above-described arrangement of the present invention, it is possible to easily, accurately and stably wind both end portions of the carcass ply around the bead cores without the necessity of preliminary forming a bending portion at the carcass cords.

DESCRIPTION OF THE PREFERRED EMBODIMENTS

One embodiment of the present invention will now be explained together with an illustrated example.

Figure 1:
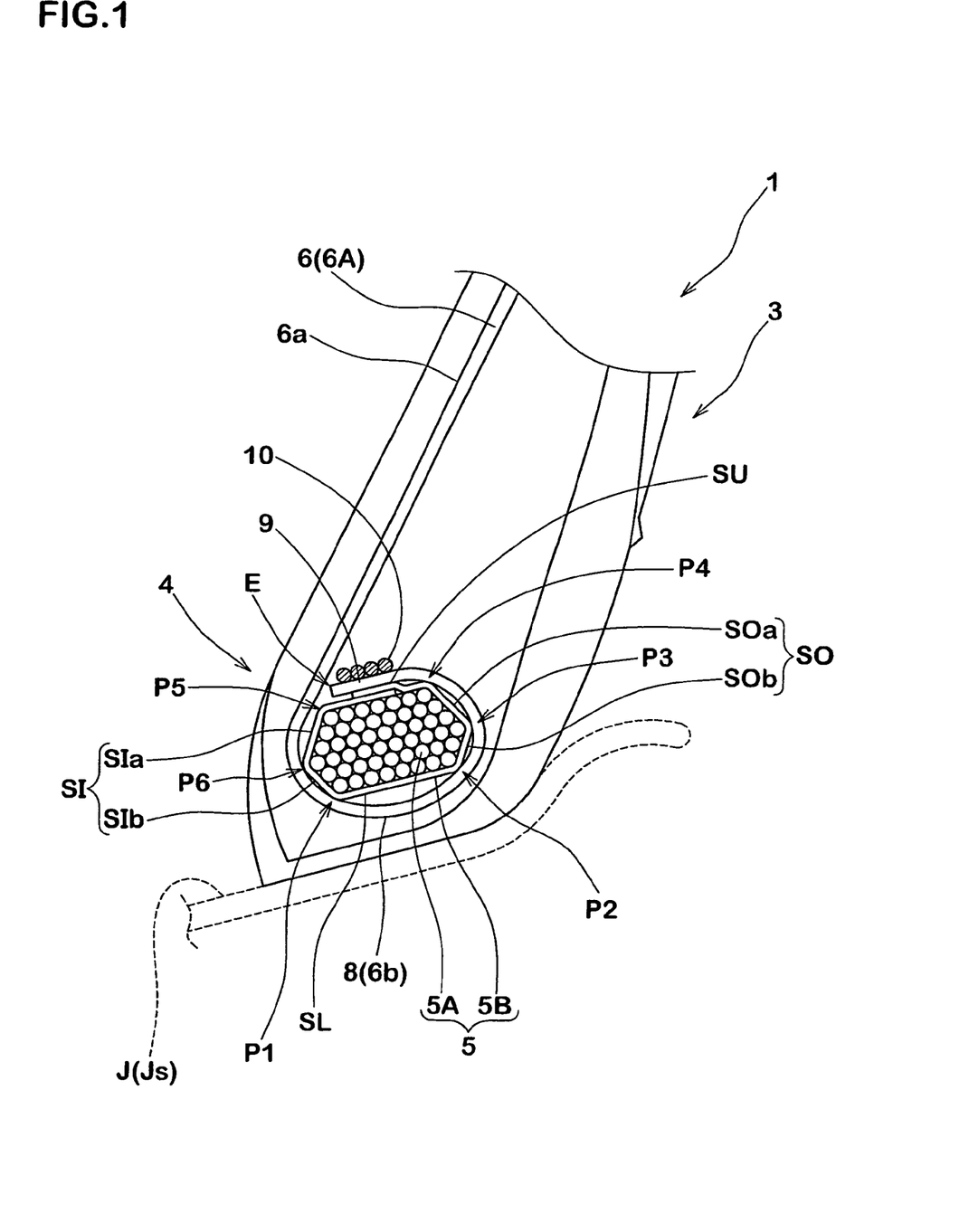
FIG. 1 is a sectional view illustrating one embodiment of a bead portion of a heavy-duty tire formed by using the method for molding a bead portion of a green tire according to the present invention.
Figure 2:
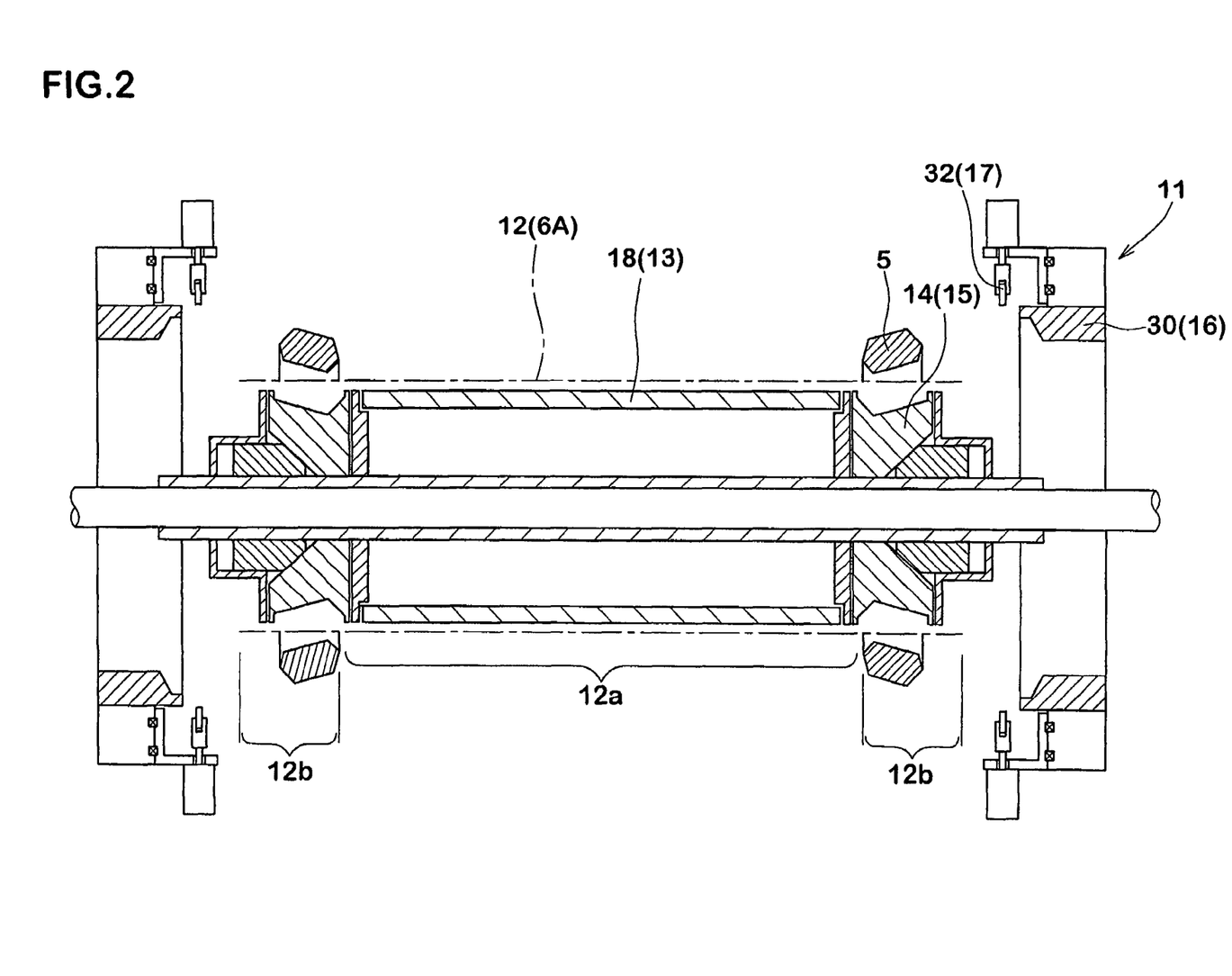
FIG. 2 is a sectional view illustrating a bead portion molding device for executing the method for molding a bead portion for a green tire.
Figure 3:
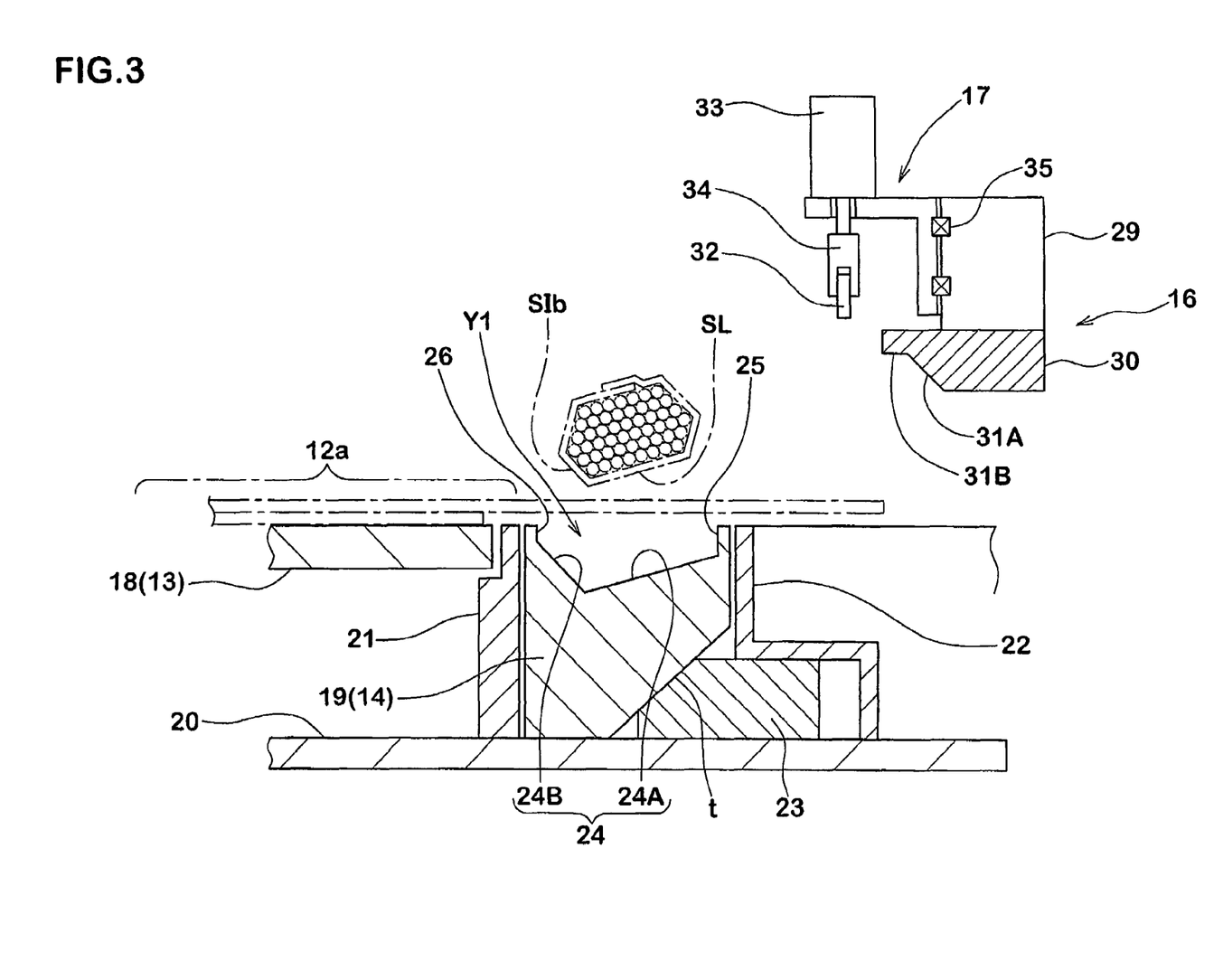
FIG. 3 is a sectional view showing its main portion in enlarged form.

FIG. 1 is a sectional view illustrating one embodiment of a bead portion of a heavy-duty tire formed by using the method for molding a bead portion of a green tire according to the present invention, FIG. 2 is a sectional view illustrating a bead portion molding device for executing the method for molding a bead portion, and FIG. 3 is a sectional view showing its main portion in enlarged form.

As illustrated in FIG. 1, the heavy-duty tire 1 comprises at least a carcass 6 that extends from a tread portion over sidewall portions 3 up to bead cores 5 of bead portions 4. A known belt layer for reinforcing the tread is disposed radially outside of the carcass 6 and inward of the tread portion.

The carcass 6 is comprised of a single carcass ply 6A in which a cord aligned body with carcass cords (steel cords) being pull-aligned in parallel is coated with a topping rubber. In case of a radial tire as in the present embodiment, the carcass cords are aligned at an angle of 75 to 90° with respect to a tire circumferential direction.

The carcass ply 6A assumes a bead-wind structure comprised of a toroidal carcass main body portion 6a bridged between the bead cores 5, 5 and carcass wound portion 6b continuing from both sides of the carcass main body portion 6a. The carcass wound portions 6b are wound around the bead cores 5 from inside to outside in the tire axial direction and their tip ends E terminate while approaching the carcass main body portion 6a. With this arrangement, they are fixed at the bead cores 5.

Here, the bead core 5 comprises a core main body 5A obtained by, for instance, winding bead wires made of steel in a multi-staged and multi-seriate manner. In the present embodiment, it is formed of the core main body 5A and a thin coating layer 5B coating its periphery. The coating layer 5B is comprised of a rubberized cloth or a rubber sheet for preventing parting of the bead wires. In this respect, the bead core 5 may be comprised of the core main body 5A only.

The bead core 5 has a polygonal sectional shape comprised of a radially inner surface SL opposing a seat surface Js of a rim J, a radially outer surface SU parallel to the radially inner surface SL, a tire axially outside surface SO connecting between tire-axially outer edges P2, P4 of the radially inner surface SL and the radially outer surface SU, and a tire-axially inside surface SI connecting between tire-axially inner edges P1, P5 of the radially inner surface SL and the radially outer surface SU. The present embodiment particularly illustrates a bead core 5 having a hexagonal sectional shape with the outside surface SO being comprised of a flexed surface including an upper inclined surface SOa and a lower inclined surface SOb while the inside surface SI is comprised of a flexed surface including an upper inclined surface SIa and a lower inclined surface SIb. In this respect, reference numerals P3, P6 illustrate peak portions of the flexed surfaces. The engaging force of the bead core 5 with the rim is improved over a wide range since the radially inner surface SL becomes substantially parallel to the rim seat Js. In the present embodiment, the rim J is a 15° tapered rim for tubeless use, and the radially inner surface SL is thus inclined with respect to a tire axial line at an angle of substantially 15°.

The carcass wound portion 6b is formed of a main portion 8 opposing the inside surface SI, the radially inner surface SL, and the outside surface SO, and a sub-portion 9 continuing into the main portion 8 and opposing the radially outer surface SU. In the present embodiment, a band in which a wrapping wire 10 is spirally wound is disposed on the sub-portion 9. This band presses and restricts the sub-portion 9 towards the radially outer surface SU of the bead core 5 to reliably prevent spring-back of the carcass cords and the following problems originating therefrom. In this respect, such problems include occurrence of air-accumulation between the sub-portion 9 and the bead core 5 when performing vulcanization molding to thus harm the durability or tendency of occurrence of blow-by phenomena or cord loosening through degraded engaging force with respect to the carcass 6.

Next, when forming a green tire for such a heavy-duty tire 1, a bead portion molding device 11 (hereinafter referred to as "molding device 11") as illustrated in FIG. 2 is used. With this arrangement, it will be possible to simply, accurately and stably form the carcass wound portions 6b without the necessity of preliminary forming a bending portion at the carcass cords.

The molding device 11 is arranged to include (I) a former 13 for forming a carcass tube 12 in which the carcass ply 6A is wound in a cylindrical manner, (II) a bead core supporting means 15 that supports the bead core 5, which is set radially outside of the carcass tube 12, upon expanding in diameter, (III) a winding means 16 that curves and winds cylindrical sub-portions 12b, which comprise both end portions of the carcass tube 12, around the bead cores 5, and (IV) a shaping means 17 that presses tip end portions 27e of the cylindrical sub-portions 12b towards the radially outer surface SU of the bead core 5 by using a pressing roller 32. In this respect, the tip end portions 27e correspond to the sub-portions 9 of the carcass wound portions 6b.

More particularly, the former 13 of the present embodiment is a first-stage former that is employed in a green tire molding step of two-staged style. The former 13 includes a cylindrical drum 18 that is driven to rotate through a driving device (not shown) such as motor. By winding a sheet-like carcass ply 6A around a former outer periphery, which is the outer periphery of the drum 18, by a single round, the cylindrical carcass tube 12 is formed. The carcass tube 12 is comprised of a cylindrical main portion 12a having a length capable of forming the carcass main body portion 6a, and cylindrical sub-portions 12b, 12b having a length capable of forming the carcass wound portions 6b. In the present embodiment, the axial-directional length of the former 13 is not more than the length of the cylindrical main body 12a so that the cylindrical sub-portions 12b are accordingly formed to project outside in the axial direction from both ends of the former 13.

Figure 4:
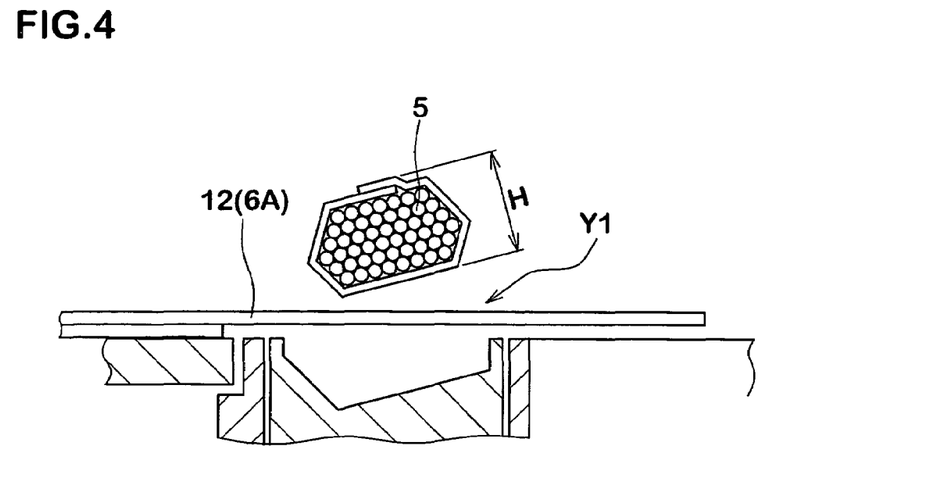
FIG. 4 is a sectional view illustrating a bead core supporter in a condition with the diameter being shrunk together with the carcass ply and the bead core.
Figure 5:
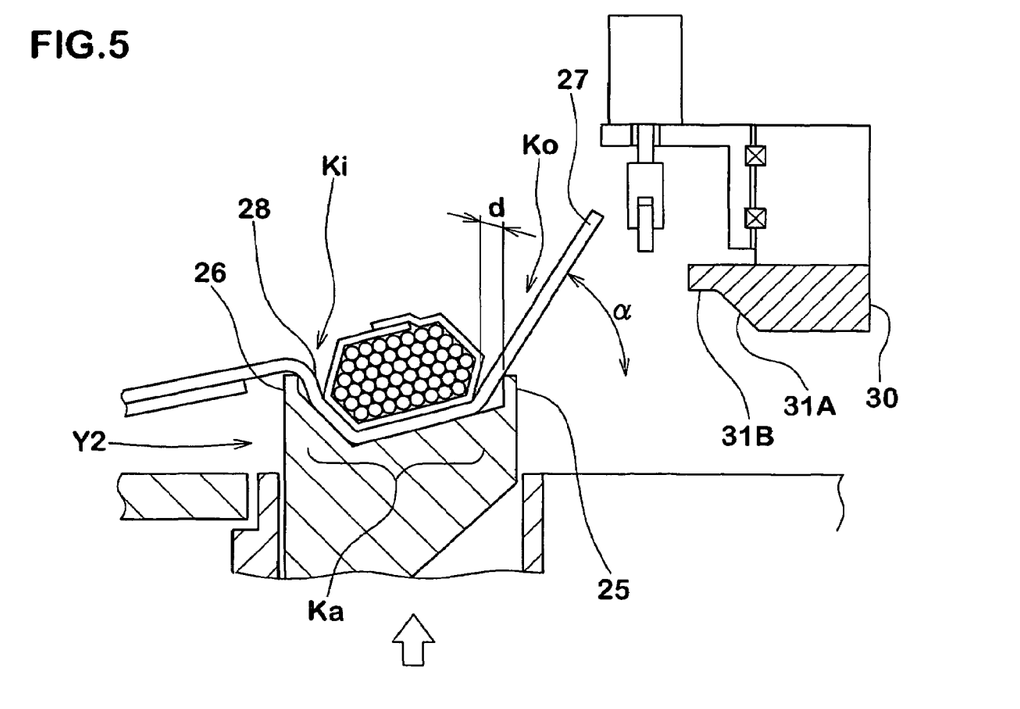
FIG. 5 is a sectional view illustrating a bead core supporter in a condition with the diameter being expanded together with the carcass ply and the bead core.

As illustrated in FIG. 3 in enlarged form, the bead core supporting means 15 comprises a bead core supporter 14 that is expandable and shrinkable in diameter and that is comprised of a plurality of segments 19 partitioned in the circumferential direction. The bead core supporter 14 is disposed on both outer sides of the former 13 and at the position of the cylindrical sub-portion 12b. The segments 19 are guided between guide plates 21, 22 in- and outside in the tire axial direction that rise up in the radial direction from a sleeve 20 that uniformly rotates with the former 13. Through lateral movement in the tire axial direction of a sliding ring 23 that is outwardly fitted onto the sleeve 20, it is possible to move in- and outside in the radial direction from a shrunk diameter condition Y1 (FIGS. 3, 4) to the expanded diameter condition YS (FIG. 5). In the present embodiment, cone-like engaging surfaces t of identical inclination are formed on the radially inner periphery of the segments 19 and the radially outer periphery of the sliding ring 23. While lateral movements in the tire axial direction are converted into movements in radial directions through these engaging surfaces t, it is possible to employ a known mechanism such as a link mechanism.

The bead core supporter 14 comprises, on its radially outer periphery, a seating surface 24 for supporting at least the radially inner surface SL of the bead core 5 for supporting the bead core 5 and an outer piece 25 that rises up outside of the seating surface 24 in the tire axial direction towards outside in the radial direction. In this respect, while the present embodiment illustrates an example in which there is provided an inner piece 26 also inside of the seating surface 24 in the tire axial direction, it is possible to omit this inner piece 26.

In the present embodiment, the seating surface 24 is formed to have a V-shaped form comprised of a first seating surface 24A that has the same inclination as the radially inner surface SL of the bead core 5 for supporting the radially inner surface SL and a second seating surface 24B that has the same inclination as the lower inclined surface SIb of the bead core 5 for supporting the lower inclined surface SIb. In the expanded diameter condition Y2 (FIG. 5), the beat core 5 may seat at the seating surface 24 to be supported thereby through the carcass ply 6A. Simultaneously therewith, the carcass ply 6A is sandwiched between the seating surface 24 and the bead core 5 for preventing positional shifts of the carcass ply 6A. For purpose of convenience, the region of the carcass ply 6A that is sandwiched between the seating surface 24 and the bead core 5 is referred to as a sandwiched region Ka while a region further outside than this sandwiched region Ka in the tire axial direction is referred to a carcass outer region Ko and a region further inside thereof as carcass inner region Ki.

The outer piece 25 is arranged in that the carcass outer region Ko may be flipped up to radially outward accompanying the expansion in diameter. In the expanded diameter condition Y2 (FIG. 5), a large clearance d that is larger than the thickness of the carcass ply 6A is formed between the outer piece 25 and the bead core 5. Accordingly, the outer piece 25 is capable of deforming the carcass outer region Ko into an outer inclined piece 27 that is inclined and extended towards radially outside without including any partially bent portions. In this respect, a similar clearance is formed between the inner piece 26 and the bead core 5 such that the carcass inner region Ki is deformed into an inner inclined piece 28 that is inclined and extended towards radially outside without including any partially bent portions.

Where the clearance d is too small or a distance h in the radial direction from a tire axial outer edge of the radially inner surface SL of the bead core 5 to an upper end of the outer piece 25 is too large, partial bent portions are apt to be generated in the carcass ply 6A. On the other hand, where the clearance d is too large or the distance h is too small, the flip-up to the carcass outer region Ko tends to be insufficient. Accordingly, the clearance d is preferably in the range of 1.0 to 4.0 times the thickness of the carcass cords (steel cords). The distance h is preferably in the range of 0.2 to 0.7 times the thickness H (FIG. 4) between the radially inner surface SL and the radially outer surface SU of the bead core 5. In this respect, setting the clearance d and the distance h such that an inclination angle α of the outer inclined piece 27 from the tire axial line to not less than 45°, and further to not less than 60° is desirable in view of winding processes that are to follow.

Figure 6:
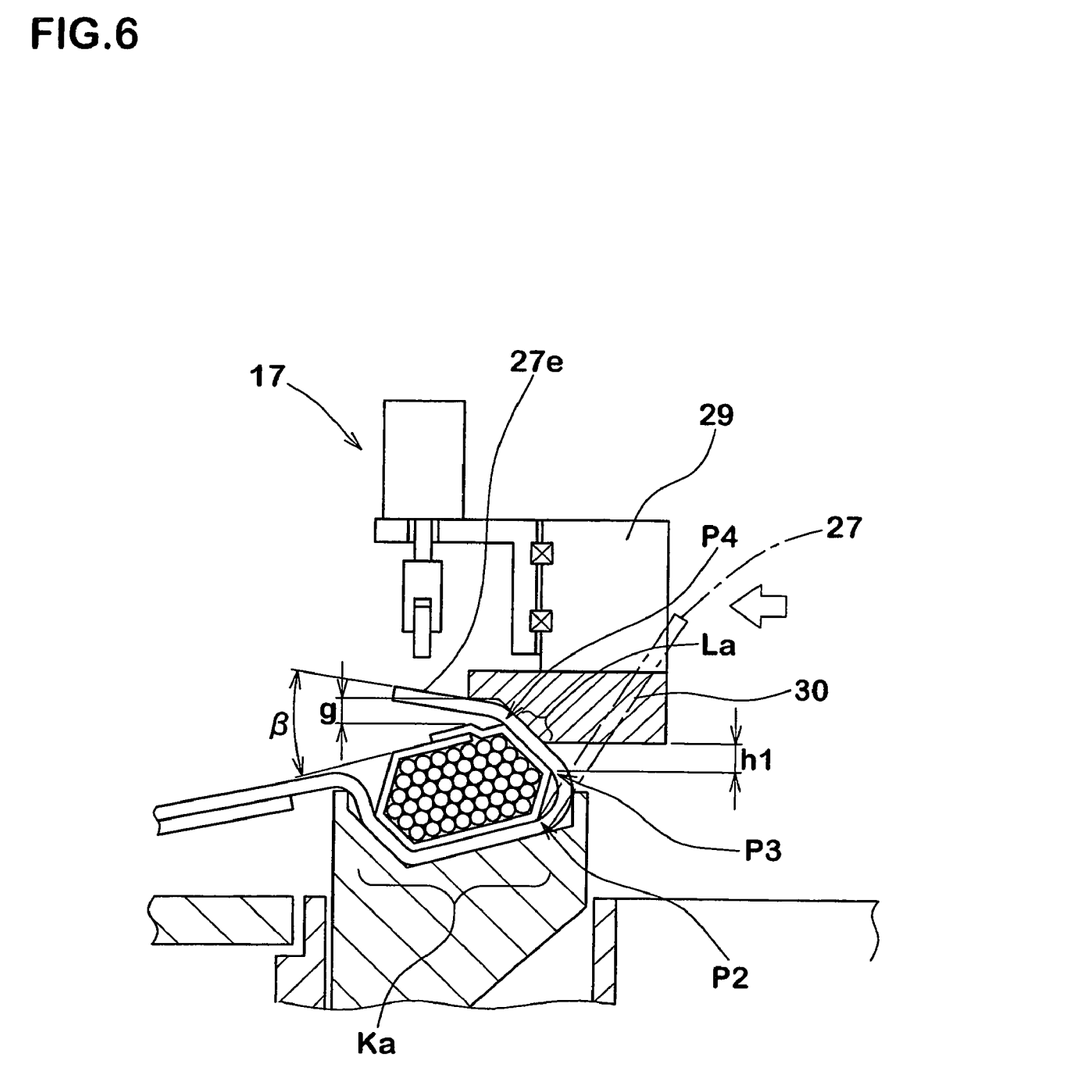
FIG. 6 is a sectional view illustrating winding of an outer inclined piece by a ply winding ring.

Next, the winding means 16 comprises a lateral moving body 29 that may rotate uniformly with the former 13 and that is capable of performing relative lateral movements with respect to the former 13 in- and outside in the tire axial direction, and an annular ply winding ring 30 that is supported by the lateral moving body 29. In the present embodiment, the ply winding ring 30 includes a first winding surface 31A that inclines along the upper inclined surface SOa of the bead core 5 and a second winding surface 31B that continues into an radially outer edge of the first winding surface 31A and that projects inwardly in the tire axial direction by a short length. As illustrated in FIG. 6, through the lateral movement of the lateral moving body 29, the ply winding ring 30 presses the outer inclined piece 27 inward in the tire axial direction and curves the outer inclined piece 27 towards the outside surface SO and the radially outer surface SU of the bead core 5.

At this time, while the outer inclined piece 27 is compressed between the first winding surface 31A and the upper inclined surface SOa, a radially inner edge of the first winding surface 31A is located radially outward than the peak portion P3 of the bead core 5 by distance h1. With this arrangement, the outer inclined piece 27 is allowed to smoothly curve between a compressed region La and the sandwiched region Ka so that occurrence of partially bent portions at the peak portions P2, P3 are prevented. The distance h1 is preferably 2.0 to 4.0 times the thickness of the carcass cords.

The second winding surface 31B comprises a clearance g between the same and the bead core 5, that is larger than the thickness of the carcass ply 6A. Accordingly, the tip end portion 27e further on the tip end side than the compressed region La can be curved towards the radially outer surface SU of the bead core 5 without causing occurrence of partially bent portions at the peak portion P4. At this time, and angle β between the tip end portion 27e and the radially outer surface SU of the bead core 5 is preferably reduced to be not more than 45°, and further to not more than 30° in view of shaping processes that are to follow. In this respect, the first and second winding surfaces 31A, 31B can also be formed as convex arc-like shapes or concave arc-like shapes, and the first and second winding surfaces 31A, 31B may alternatively be formed of a single curved surface.

Figure 7:
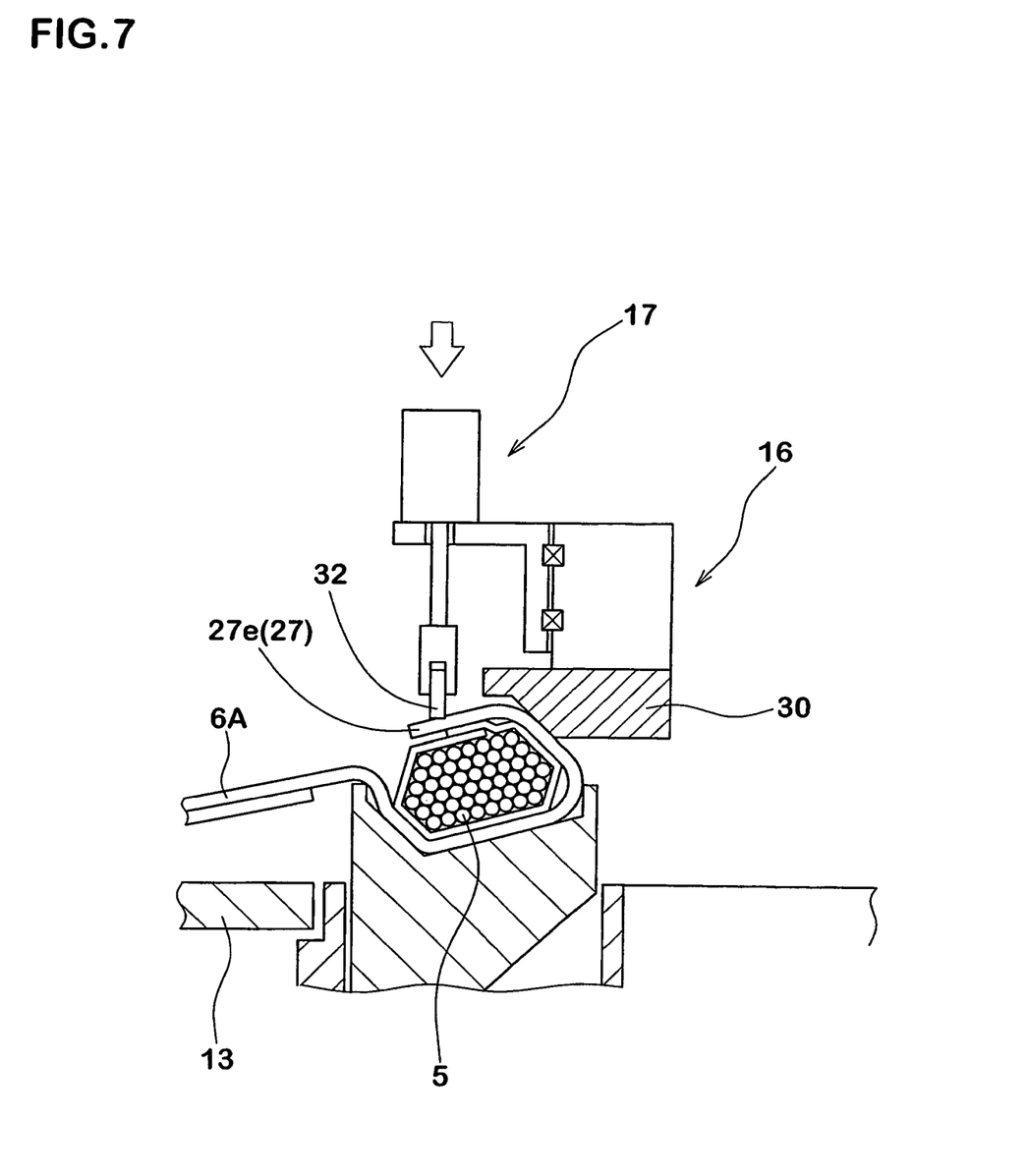
FIG. 7 is a sectional view illustrating pressing of the outer inclined piece by a pressing roller.

As illustrated in FIGS. 6 and 7, the shaping means 17 comprise a pressing roller 32 that presses the tip end portion 27e towards the radially outer surface SU of the bead core 5 in a curved condition of the outer inclined piece 27. The pressing roller 32 is supported in a freely rotating (auto-rotating) manner around a roller center and in a revolving manner around a tire axial center.

In the present embodiment, the pressing roller 32 is pivotally supported at a rod end of a reciprocating means 33 such as a cylinder including the rod reciprocating in the radial direction in a freely rotating (auto-rotating) manner though a roller holder 34. The reciprocating means 33 is supported to be relatively rotatable with respect to the lateral moving body 29 around the tire axial center through a bearing 35 or the like.

Here, the carcass ply 6A on the former 13, the bead core 5, and the ply winding ring 30 can be rotated uniformly with the former 13. These and the pressing roller 32 may relatively rotate around the tire axial center. Accordingly, by rotating and driving the former 13, the pressing roller 32 can go around while pressing the tip end portion 27e towards the radially outer surface SU of the bead core 5. In other words, the tip end portion 27e can be deformed into a direction as to face along the radially outer surface SU over the entire periphery.

Figure 8A:
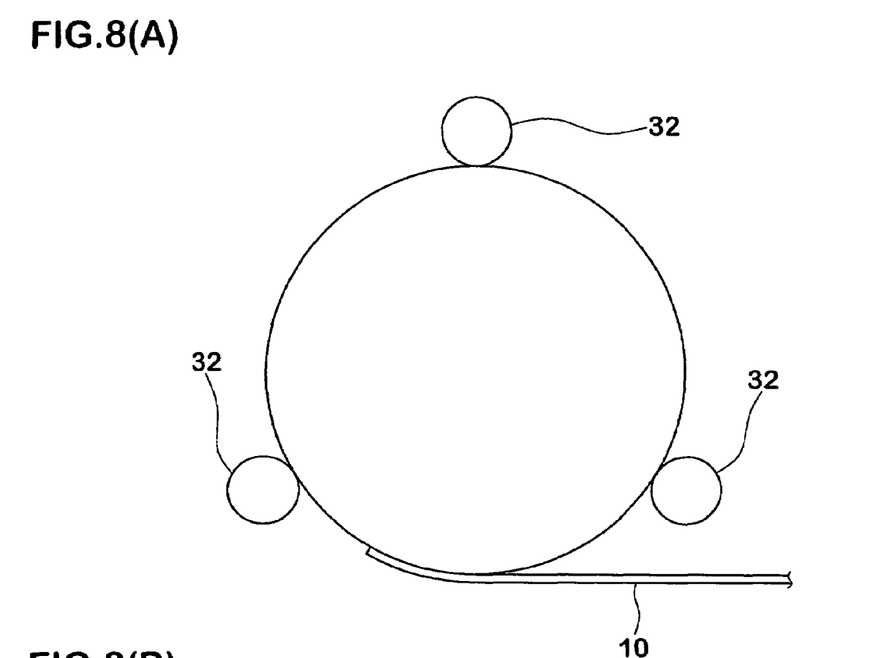
FIGS. 8(A) and 8(B) are diagrams for explaining alignments for the pressing roller.

In this respect, as illustrated in FIG. 8(A), the shaping means 17 is preferably arranged in that a plurality of pressing rollers 32 is disposed at intervals in the circumferential direction. At this time, as conceptually shown in FIG. 8(B), the tip end portion 27e can be more effectively deformed by disposing the plurality of pressing rollers 32 in a positionally shifted manner in the tire axial direction.

Figure 8B:
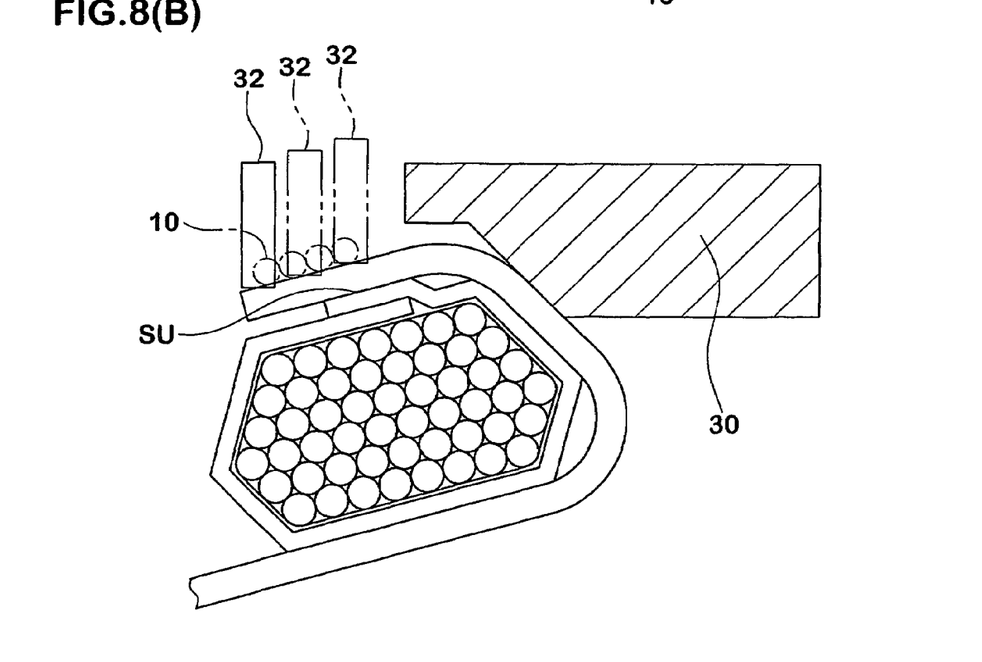

In the present embodiment, for pressing and restricting the deformed tip end portion 27e towards the radially outer surface SU of the bead core 5, a band comprised by spirally winding the wrapping wire 10 (FIG. 8(B)) radially outside of the tip end portion 27e. Winding of the wrapping wire 10 is performed together with the pressing of the tip end portion 27e towards the bead core 5 through the pressing rollers 32. It is accordingly possible to effectively and highly accurately wind the wrapping wire 10 without causing any slacking or irregularities in the wrapping wire 10. In this respect, the pressing rollers 32 sequentially run on the wound wrapping wire 10. Besides spirally winding the wrapping wire 10, the band may alternatively be comprised by a winding tape of small width in which a plurality of wrapping wires 10 is coated with rubber by a single round in the circumferential direction.

By employing the molding device 11, it is possible to wind both ends of the carcass ply 6a around the bead cores without forming a plastic-deformed bending poriton in which carcass cords are partially bent, and the carcass wound portion 6b can be easily, accurately and stably formed. It is accordingly possible to improve the productivity of tires of bead-wind structure and to restrict degradations in cord rigidity and cord strength accompanying the bending of the carcass cords.

Next, the method for molding a bead portion employing the molding device 11 includes (1) a carcass tube forming step in which a carcass tube 12 is formed by cylindrically winding the carcass ply 6A on an outer periphery of the former 13, (2) a setting step for the bead core 5 in which the bead core 5 is set radially outside of the carcass tube 12, and (3) a bead core supporting step for supporting the bead core 5 while sandwiching the carcass ply 6A between the seating surface 24 and the bead core 5 through the expansion in diameter of the bead core supporter 14. In this respect, the bead core supporting step includes a flip-up step of flipping the carcass outer region Ko up through the outer piece 25 of the bead core supporter 14 for deforming the carcass outer region Ko into an outer inclined piece 27 that is inclined and extended towards radially outside without including any partially bent portions.

The method for molding a bead portion further includes (4) a curving step of pressing the outer inclined piece 27 inside in the tire axial direction by using a ply winding ring 30 for curving the same towards the outside surface SO and the radially outer surface SU of the bead core 5, and (5) a pressing step of pressing a tip end portion 27e of the outer inclined piece 27 in the curved condition towards the radially outer surface SU of the bead core 5 by using the pressing roller 32.

Through these steps, it is possible to wind both end portions of the carcass ply 6A, that is, the cylindrical sub-portions 12b, around the bead cores 5 in an easily, accurately and stably without the necessity of preliminarily bending the carcass cords.

While a particularly preferred embodiment of the present invention has been explained so far, the present invention is not limited to the illustrated embodiment alone but may be executed upon modifying the same into various forms, for instance, in which the former 13 is arranged as a former that is used in a green tire molding step of single-staged method.

What is claimed is:

1. A method for molding a bead portion for a green tire, comprising a carcass ply of steel cords serially provided with carcass wound portions wound around bead cores on both sides of a carcass main body portion extending from a tread portion over sidewall portions up to the bead cores of bead portions, the bead cores having a polygonal sectional shape comprised of a radially inner surface opposing a seat surface of a rim, a radially outer surface parallel to said radially inner surface, a tire-axially outside surface connecting between tire-axially outer edges of said radially inner surface and said radially outer surface, and a tire-axially inside surface connecting between tire-axially inner edges of said radially inner surface and said radially outer surface, the method including:

a carcass tube forming step of forming a carcass tube by cylindrically winding the carcass ply on an outer periphery of a former, a bead core setting step of setting the bead core radially outside of the carcass tube, and a bead core supporting step of employing a bead core supporter expandable and shrinkable in diameter and having a seating surface for supporting the radially inner surface of the bead core while sandwiching the carcass ply between the seating surface and the bead core by expanding the diameter of the bead core supporter, said bead core supporting step further including a flip-up step of flipping a carcass outer region, defined as a portion of the carcass ply being further outside in the tire axial direction than a sandwiched region of the carcass ply sandwiched between the seating surface and the bead core, so as to become an outer inclined portion that inclines and extends towards outside in the radial direction without including any partially bent portions due to the provision of a flange at the bead core supporter that rises radially outside from a tire-axially outer end of the seating surface with a clearance between the same and the bead core, that is larger than the thickness of the carcass ply, a curving step of pressing the outer inclined portion to the tire-axially outside surface of the bead core by a ply winding ring, thereby curving the outer inclined portion so that its tip end portion approaches the radiall outer surface of the bead core, and a pressing step of pressing the tip end portion of the outer inclined portion in a curved condition against the radially outer surface of the bead core by using a pressing roller.

2. The method for molding a bead portion for a green tire as claimed in claim 1, wherein the bead core has a hexagonal sectional shape in which the tire-axially outside surface and the tire-axially inside surface of the bead core respectively comprise flexed surfaces each comprised of an upper inclined surface outside in the radial direction and a lower inclined surface inside in the radial direction.

3. The method for molding a bead portion for a green tire as claimed in claim 1, wherein the pressing roller of the pressing step presses the tip end portion of the outer inclined portion against the radially outer surface of the bead core while relatively rotating, with respect to the former, the carcass ply on the former, and the bead core, around a tire axial center and deforms the tip end portion of the outer inclined portion along the radially outer surface.

4. The method for molding a bead portion for a green tire as claimed in claim 1, wherein the pressing step includes a wrapping wire winding step in which a wrapping wire is wound around on the tip end portion of the outer inclined portion that has been pressed against the radially outer surface of the bead core.

5. The method for molding a bead portion for a green tire as claimed in claim 1, wherein a minimum value of said clearance between the flange and the bead core is 1.0 to 4.0 times the thickness of the steel cords of the carcass ply.

6. The method for molding a bead portion for a green tire as claimed in claim 1, wherein a distance in the radial direction between an radially upper end of the flange and a tire-axially outer edge of the radially inner surface of the bead core is 0.2 to 0.7 times the thickness between the radially inner surface and the radially outer surface of the bead core.

7. A bead portion molding device for a green tire, comprising a carcass ply of steel cords serially provided with carcass wound portions wound around bead cores on both sides of a carcass main body portion extending from a tread portion over sidewall portions up to the bead cores of bead portions, the bead cores having a polygonal sectional shape comprised of a radially inner surface opposing a seat surface of a rim, a radially outer surface parallel to said radially inner surface, a tire-axially outside surface connecting between tire-axially outer edges of said radially inner surface and said radially outer surface, and a tire-axially inside surface connecting between tire-axially inner edges of said radially inner surface and said radially outer surface, and comprising:

a former for forming a carcass tube by winding a carcass ply cylindrically on the outer periphery thereof, and a bead core supporting means that comprises a bead core supporter expandable and shrinkable in diameter and having a seating surface that supports the radially inner surface of the bead core set radially outside of the carcass tube while sandwiching the carcass ply between the seating surface and the bead core when expanded in diameter, said bead core supporter including a flange that rises up radially outward from a tire-axially outer end of the seating surface, said flange flipping up a carcass outer region, defined as a portion of the carcass ply located further outside in the tire axial direction than the sandwiched region of the carcass ply sandwiched between the seating surface and the bead core, so as to become an outer inclined portion that inclines and extends towards outside in the radial direction without including any partially bent portions due to the provision of a clearance between the flange and the bead core being larger than the thickness of the carcass ply in the diametrically expanded condition of the bead core supporter a winding means that comprises a ply winding ring that is relatively movable with respect to the outer inclined portion in- and outside in the tire axial direction and that presses the outer inclined portion through the relative movement against the axially outside surface of the bead core thereby curving the outer inclined portion towards the radially outer surface of the bead core; and a shaping means including a pressing roller for pressing a tip end portion of the outer inclined portion in a curved condition against the radially outer surface of the bead core.

8. The bead portion molding device for a green tire as claimed in claim 7, wherein said pressing roller presses the tip end portion of the outer inclined portion against the radially outer surface of the bead core while relatively rotating, with respect to the former, the carcass ply on the former, and the bead core, around a tire axial center.

9. The bead portion molding device for a green tire as claimed in claim 7, wherein a minimum value of said clearance between the flange and the bead core is 1.0 to 4.0 times the thickness of the steel cords of the carcass ply.

10. The bead portion molding device for a green tire as claimed in claim 7, wherein a distance in the radial direction between an radially upper end of the flange and a tire-axially outer edge of the radially inner surface of the bead core is 0.2 to 0.7 times the thickness between the radially inner surface and the radially outer surface of the bead core.

* * * * *